Figure 1:
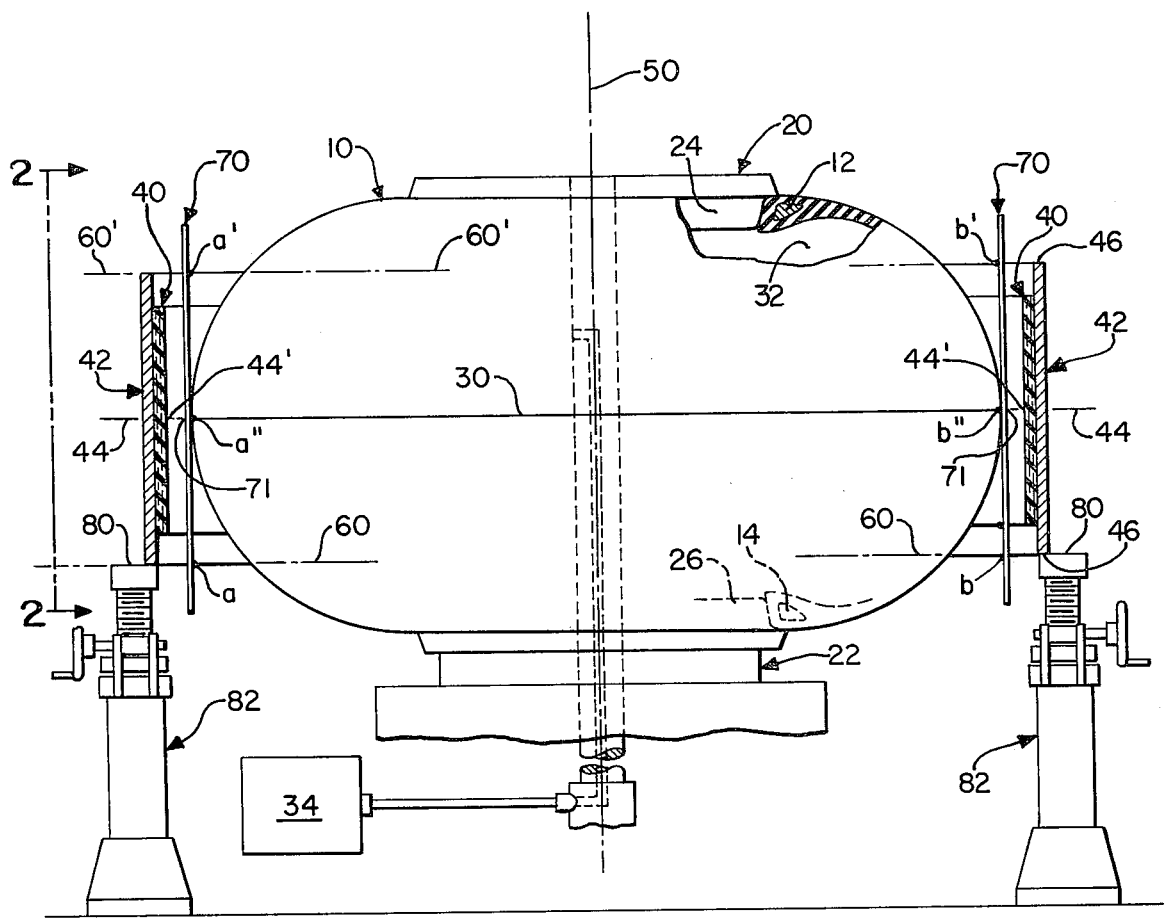

United States Patent [19]

McEvoy et al.

[11] 3,950,201

[45] Apr. 13, 1976

[54] TIRE MANUFACTURE

[75] Inventors: Charles J. McEvoy; Warren R. Dietrich, both of Topeka, Kans.

[73] Assignee: The Goodyear Tire & Rubber Company, Akron, Ohio

[22] Filed: May 24, 1974

[21] Appl. No.: 473,118

[52] U.S. Cl.............. 156/126; 156/128 R; 156/405; 249/53 R
[51] Int. Cl.².......................................... B29H 17/37
[58] Field of Search...... 33/286, 180 AT; 425/28 R, 425/29, 11, 12, 19; 249/53; 264/315; 156/126, 127, 129, 394 R

[56] References Cited
UNITED STATES PATENTS

| | | | |
|---|---|---|---|
| 2,407,845 | 9/1946 | Nemeyer | 33/286 |
| 2,872,704 | 2/1959 | Shaevitz | 425/19 |
| 3,070,478 | 12/1962 | Riddle | 156/126 |
| 3,364,093 | 1/1968 | Porter | 156/128 I |
| 3,396,221 | 8/1958 | Balle et al. | 264/315 |
| 3,461,502 | 8/1969 | Turk et al. | 425/29 |
| 3,738,893 | 6/1973 | Edler | 156/394 |

FOREIGN PATENTS OR APPLICATIONS 723,621  12/1965  Canada............................ 156/128 I

OTHER PUBLICATIONS

"Tool Engineers Handbook", American Society of Tool Engineers, pp. 1543, 1544, 1546, McGraw Hill, NY, 1949.

*Primary Examiner*—William A. Powell
*Assistant Examiner*—John E. Kittle
*Attorney, Agent, or Firm*—F. W. Brunner; R. S. Washburn

[57] ABSTRACT

To compensate for shifts of the mid-circumferential centerline of an expansible carcass relative to the apparatus for expanding the carcass into an inexpansible breaker-belt positioned coaxially and in annularly spaced relation therearound, a reference plane is provided by three circumferentially spaced points directly connected to and equidistantly from the mid-circumferential line of the carcass. The breaker-belt can then be registered in symmetrically centered relation to the carcass by reference to such reference plane despite shifts of such line relative to the apparatus.

The foregoing abstract is not to be taken as limiting the invention of this application, and in order to understand the full nature and extent of the technical disclosure of this application, reference must be made to the accompanying drawing and the following detailed description.

4 Claims, 2 Drawing Figures

TIRE MANUFACTURE

The present invention relates to the manufacture of tires, particularly to tires which are large as compared to tires for ordinary passenger vehicles. Still more particularly, the invention relates to methods for assembling a circumferentially expandable tire carcass and an endless inexpansible tire breaker-belt to form a unitary tire structure.

During expansion of a tire carcass from its cylindrical state as built to its toroidal shape and diameter to be joined with an inextensible tire breaker-belt, the mid-circumferential line of the carcass can be displaced from its desired concentricity with the carcass axis and/or from its coplanar relation with a plane perpendicular to the carcass axis and equidistant between the beads of the carcass. Such displacements are normally small but are not desirable in making tires of good quality.

A primary object of the invention, therefore, is to provide for accurately locating the circumferential centerline of the tire breaker-belt in coplanar relation with the mid-circumferential line of the carcass, while forming such unitary tire structure thereby to alleviate the above-described problems.

Figure 2:
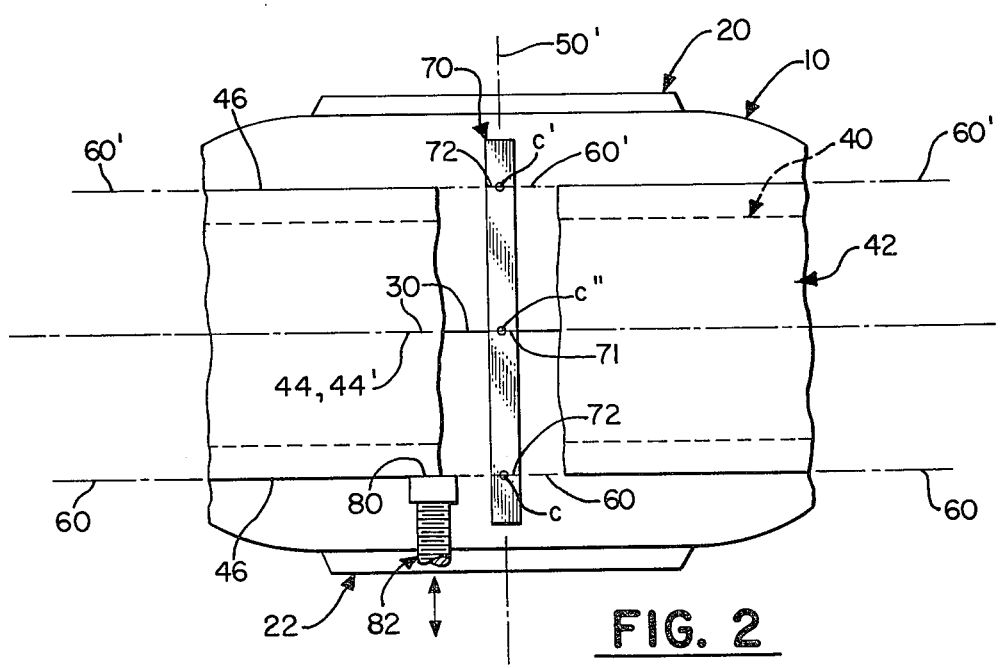

To acquaint persons skilled in the art more fully with the invention, preferred embodiments of the invention are described below with reference to the drawings in which:

FIG. 1 is a schematic representation of an axial cross-section of apparatus in accordance with the invention; and FIG. 2 is a schematic view taken as indicated by the line 2—2 in FIG. 1 illustrating a preferred mode of practicing the invention.

Referring to the drawings and particularly to FIG. 1, a preferred method and means for practicing the invention is shown schematically therein. The carcass 10, which is to be shaped by expanding its circumference radially outwardly of its own axis while its respective beads 12,14 are moved coaxially and equally toward each other, can be built in any known manner and is disposed on a tire building machine (not shown) having two circular members 20,22 which are mounted coaxially on suitable known mechanism for moving the members toward and away from each other. The upper or outboard bead ring 24 which engages and moves the correspondingly associated carcass bead 12 is mounted on the member 20 and a lower or inboard bead ring 26 is mounted on the opposing member 22. During the building of the carcass 10, the mid-circumferential plane thereof is determined and a marking line 30 is circumscribed thereon in coincidence with such mid-circumferential plane in a known manner.

In order to expand the carcass, a cavity 32 enclosed within the carcass and between the respective members is connected to a source 34 of gas at above atmospheric pressure in the usual manner.

An endless inexpansible belt 40 destined to become a part of the tire structure being formed is constructed in or placed within a transfer ring 42 such that its circumferential centerline 44 is in a fixed parallel relation to at least one edge 46 of the ring and preferably equidistant between and parallel to each lateral edge of the ring before the transfer ring is moved into the position illustrated in FIG. 1.

In conventional practice, the mid-circumferential centerline of the belt and of the ring define a plane which is maintained, at least during the assembly of the belt and carcass, in perpendicular relation to the axis 50 of the apparatus used for such assembly. Moreover, this plane in normal practice is, at least during expansion of the carcass, maintained equidistant between the apparatus members 20,22 which carry the respective bead rings 24,26 and, at least before substantial expansion of the carcass has taken place, is coplanar with the mid-circumferential plane of the carcass which is indicated by the line 30 described about the carcass 10 as previously mentioned.

However, for reasons which are not known sufficiently to be fully described, the mid-circumferential line 30 on the carcass can become displaced from its desired concentric and/or coplanar relation to the axis and equatorial plane of the apparatus. This displacement conflicts with the well known desirability of having the mid-circumferential centerline of the belt and the mid-circumferential line on the carcass coincide as accurately as possible at the time the carcass is expanded into adherent contact with the belt.

It will be observed that the mid-circumferential line 30 marked on the carcass 10 becomes hidden from view and inaccessible for direct measurement as the diameter of the carcass approaches the diameter of the belt being applied.

The present invention arises, at least in part, out of the surprising discovery that undesirable movements of the mid-circumferential line of the carcass can occur (relative to the apparatus being used) not only during the expansion of the carcass before the belt is placed in annularly spaced relation around the carcass, but also after the belt is so placed during the relatively small amount of expansion required to join the belt and carcass while the mid-circumferential centerline is hidden from view. Heretofore, the displacements of the mid-circumferential centerline on the carcass could occur without being observed and corrected, in which event defective tires were sometimes produced.

In accordance with the present invention, a reference plane 60 (or 60') is provided, which is accessible for use in properly aligning and registering the respective lines, 30 and 44, in coincidence with each other, by establishing a plurality of points a,b,c, (or a',b',c') each of which is fixed equidistantly axially of the carcass from a correspondingly associated point, a'',b'',c'', on the mid-circumferential line 30 of the carcass. The plurality of points define reference plane 60 (or 60') which has a fixed parallel relation only to the mid-circumferential line on the carcass such that any shift of such mid-circumferential line from its intended location can be observed and compensated for in ways now to be described.

It is to be noted particularly that the reference plane 60 (or 60') is, by the gauge strips 70 and the respective marks, 71,72, thereon, established in a fixed parallel relation directly with the mid-circumferential line 30 of the carcass and is not, therefore, related in any positive, fixed manner with the apparatus for shaping the carcass. Hence, the reference plane 60 may be and often is disposed non-coincidently of the equatorial plane of the apparatus for shaping the carcass.

To carry out the invention, we provide a plurality of gauge strips 70, FIG. 2, three of which are normally sufficient. Each gauge strip is temporarily attached to the carcass so as to extend parallel with the carcass axis 50' and axially outwardly of the lateral edges 46 of the transfer ring, when the latter is disposed about the carcass. Preferably, the gauge strips 70 are applied to the carcass 10 while it is in its partially expanded state, as illustrated in FIG. 1, and before the transfer ring 42 has been disposed in the position there illustrated. Each of the gauge strips is provided with a first or center mark 71 which is placed to coincide with the mid-circumferential line 30 circumscribed about the carcass at, for example, the point $a''$. Each gauge strip also has at least one second mark 72 spaced axially from the first mark 71 a distance corresponding to the lateral, axial, dimension of the ring 42 from its mid-circumferential line 44' to its respectively associated lateral edge 46 when such ring is disposed in proper registry with the carcass such that the mid-circumferential lines of the belt and of the carcass are truly coplanar.

The transfer ring 42 containing the belt 40 is then disposed in surrounding annularly spaced relation about the carcass as may be seen in FIG. 1 such that the ring support surfaces 80 of the respective ring support devices 82 locate the mid-circumferential line 44 of the belt at least approximately coplanar with the mid-circumferential line 30 inscribed on the carcass.

The second marks 72 carried by the respective gauge strips 70 define a plane 60 known to be parallel to the carcass mid-circumferential line 30 and which plane is otherwise unrelated to the positions of the respective bead rings 12,14, or to the carcass axis 50'. Thus, any inadvertent shifting of the carcass itself and particularly of its mid-circumferential line will be represented by a reference plane accessible for direct reference use. Hence, such shift of the line 30 can be compensated for until the carcass 10 actually contacts the belt 40.

In accordance with our invention, the ring support surfaces 80 can be adjusted in directions parallel to the axis 50 independently of one another so as to accurately align a respectively associated edge 46 of the ring with the points $a,b,c$ (or $a',b',c'$), represented by the marks 72 carried by the associated gauge strips 70 so as to locate the selected edge 46 of the ring in precise coplanar relation with the reference plane 60. By making the distance between the first, center, mark 71 and the second mark 72 on each gauge strip 70 equal to the distance between the belt centerline 44 and one edge 46 of the ring 42, the belt centerline and the mid-circumferential line 30 on the carcass 10 can be adjusted to be and remain coincident, and coplanar as the carcass expands to engage the belt, independently of shifts of the mid-circumferential line on the carcass relatively of either the carcass axis 50' or of its beads 12 and 14.

In summary, our invention provides for assembling an expansible tire carcass and an inexpansible tire breaker-belt so as to locate the circumferential centerline of the carcass and the circumferential centerline of the belt in coincident relation, with improved precision, in spite of the common but unpredictable displacements of the carcass centerline with respect to the bead portions of the carcass which occur during shaping of the carcass from its cylindrical state as built to is fully expanded diameter in contact with the inexpansible belt. While a simple and straightforward method and apparatus for accomplishing our aims have been disclosed, it will be now apparent to persons skilled in the art that numerous equivalent methods and/or devices can be provided by which the centerline of the belt transport ring and of the endless belt therein can be adjusted to accord with the actual position of the mid-circumferential line of the carcass despite some displacement thereof from the theoretical plane normal to the axis and equally spaced between the bead carrying members of the shaping apparatus.

While certain representative embodiments and details have been shown for the purpose of illustrating the invention, it will be apparent to those skilled in the art that various changes and modifications may be made therein without departing from the spirit or scope of the invention.

What is claimed is:

1. In a method of assembling an endless inexpansible belt and an expandable tire carcass to make a pneumatic tire, the improvement comprising the steps of establishing a plurality of points each fixed equidistantly at a predetermined distance axially of said carcass from a respectively associated point on the mid-circumferential line of said carcass such that said plurality of points define a reference plane fixed directly with respect to said mid-circumferential line of the carcass independently of apparatus supporting the carcass, placing said belt in an endless cylindrical ring having a lateral edge parallel to the mid-circumferential centerline of the belt, and spaced therefrom by said predetermined distance, locating said belt and said ring in surrounding annularly spaced relation about said carcass with the circumferential centerline of said belt coplanar with the mid-circumferential line of said carcass by locating said lateral edge coplanar with said reference plane.

2. In the method as claimed in claim 1, wherein said plurality of points are provided respectively by ring support surfaces of three support stands spaced radially from and angularly about said carcass, each said support surface being adjustable independently of the others thereof in a direction parallel to the axis of said carcass, and wherein said ring is provided with means engageable individually with said support surfaces to position the circumferential centerline of said belt coplanar with said mid-circumferential line of said carcass.

3. In the method as claimed in claim 1, providing said plurality of points by fixing to said carcass, in a partially expanded state thereof, a plurality of gauge strips each having a mark coincident with one said correspondingly associated point on said mid-circumferential line and a second mark providing a respective one of said plurality of points defining said reference plane, then placing said lateral edge of said ring in coplanar relation with said reference plane as defined by the plurality of second marks, and after expanding said carcass to adherently engage said belt, removing said gauge strips from between said carcass and said belt.

4. In an apparatus for assembling an endless inexpansible tire breaker-belt and an expansible tire carcass in making a pneumatic tire, the improvement comprising shaping means for shaping said carcass from a cylindrical state to a toroidal state, a cylindrical ring of endless rigid form for disposing said breaker-belt annularly about said carcass, said ring having a lateral edge disposed parallel to and a predetermined distance from the circumferential centerline of said breaker-belt, a plurality of ring supporting means disposed in angularly spaced relation about the axis of said carcass shaping mans, each said supporting means being adjustable independently of the others thereof in directions parallel to said axis, and a plurality of gauge strips each having a center mark and a second mark spaced therealong from said center mark a distance equal to said predetermined distance, each of said gauge strips being removably attachable to said carcass in circumferentially spaced relation to extend parallelly of said axis with said center mark disposed at the mid-circumferential line of said carcass.

* * * * *